Dec. 8, 1925.  
P. P. COMMANDER  
PACKING BENCH  
Filed Sept. 15, 1924   2 Sheets-Sheet 2
1,565,058
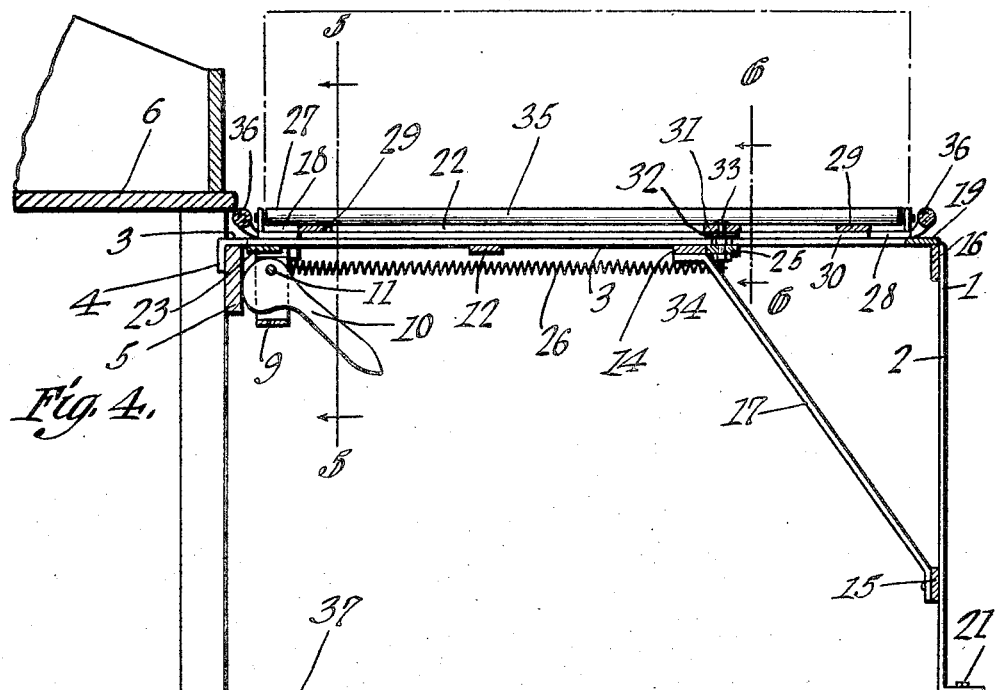
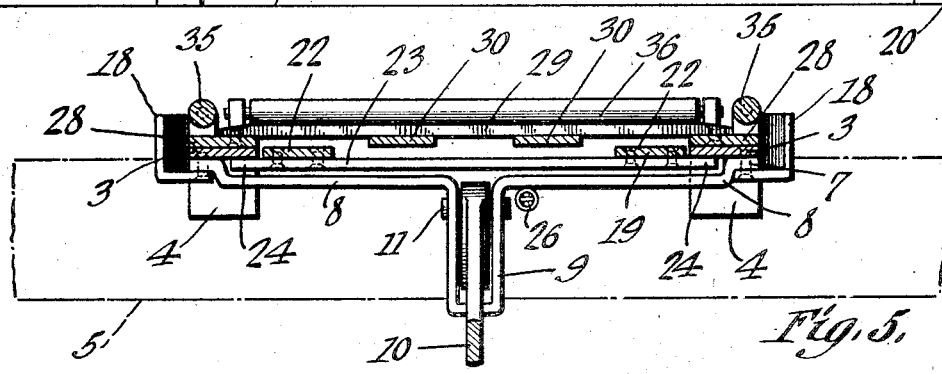
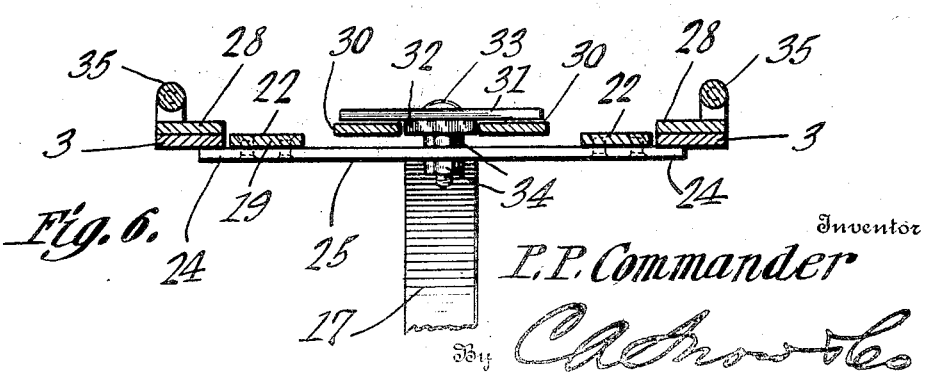
Inventor  
P. P. Commander Patented Dec. 8, 1925.

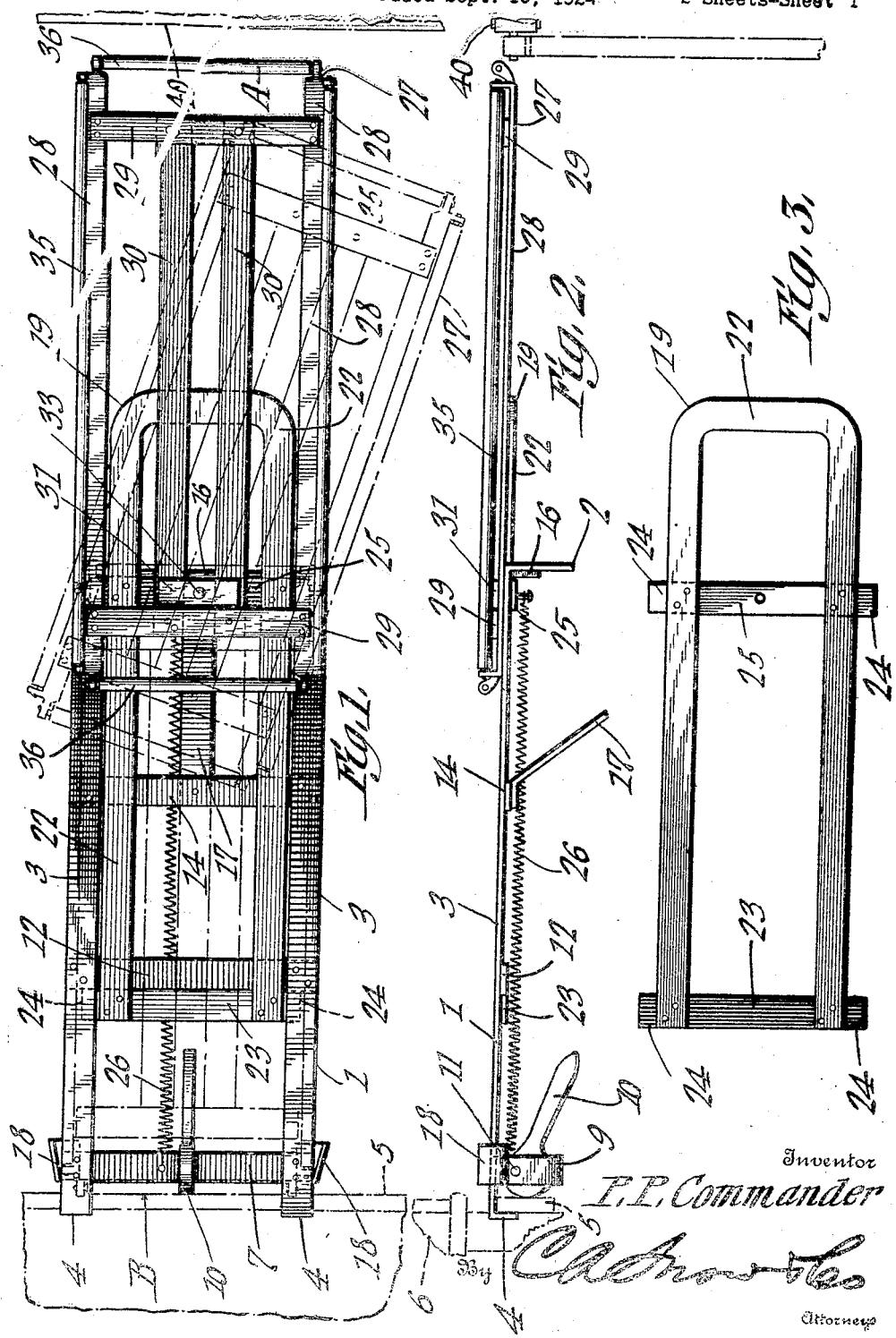

1,565,058

UNITED STATES PATENT OFFICE.

PAUL P. COMMANDER, OF DOERUN, GEORGIA.

PACKING BENCH.

Application filed September 15, 1924. Serial No. 737,839.

*To all whom it may concern:*

Be it known that I, PAUL P. COMMANDER, a citizen of the United States, residing at Doerun, in the county of Colquitt and State of Georgia, have invented a new and useful Packing Bench, of which the following is a specification.

The device forming the subject matter of this application is a bench of that general sort on which boxes are placed whilst oranges and other fruit are being packed in the boxes, and, generally and broadly stated, the invention aims to provide novel means whereby the box may be turned readily end for end, so that the empty compartment of the box may be placed adjacent to the bin of the like which contains the fruit that is being packed, the construction being such that the box, having been filed, may be carried outwardly and away from the bin, to be deposited upon a conveyor or the like.

It is within the province of the disclosure to improve generally and to enhance the utility of devices of that sort to which the invention appertains.

Although a preferred form of the invention has been shown, it will be understood that a mechanic, working within the scope of what is claimed, may make changes and improvements, without departing from the spirit of the invention.

In the drawings:—Figure 1 shows in plan, a device constructed in accordance with the invention, the slide and the platform being advanced, and the platform being shown in dotted line in a position which it will assume after it has been swung laterally; Figure 2 is a side elevation, the parts being in the positions depicted in Figure 1, and some portions of the device being broken away; Figure 3 is a plan showing the slide which is mounted for right-line reciprocation on the support or bench; Figure 4 is a longitudinal section, some parts being in elevation, and the slide and the platform being retracted from the position delineated in Figures 1 and 2; Figure 5 is a cross section on the line 5—5 of Figure 4; and Figure 6 is a cross section on the line 6—6 of Figure 4.

The device forming the subject matter of this application embodies a support 1, which is in the form of a bench, including approximately vertical legs 2 which may be extended to form top bars 3. At their lower ends, the legs 2, as shown in Figure 4, are supplied with outstanding feet 20 adapted to be held by securing elements 21 on the floor 37—although, if it is desired to move the bench from place to place, the securing elements 21 will be omitted.

For convenience in describing the relative locations of parts, that end of the machine to which the reference letter A is applied, in Figure 1, will be considered as the front end of the machine, and that end to which the reference letter B is applied, will be considered the rear end. The foregoing being understood, it may be stated that the rear ends of the top bars 3 of the bench extend across a cleat 5 on a bin 6, or other instrumentality, containing the fruit which is to be packed, the bench 1 being supported at its forward end by the legs 2, and at its rear end by the cleat 5. The top bars 3 of the bench are supplied at their rear ends with depending fingers 4 which engage behind the cleat 5.

A rear cross piece 7 is connected at its ends to the top bars 3, as shown best in Figure 5, and, for a purpose to be explained hereinafter, is offset downwardly, as shown at 8. Intermediate its ends, the rear cross piece 7 is fashioned into a depending U-shaped bracket 9, carrying a clamp 10, which may be a cam lever, fulcrumed at 11 on the bracket. The cam lever 10 coacts with the fingers 4 to bind the rear end of the bench 1 on the cleat 5, as outlined in Figure 4, and, consequently, when the movable parts of the device (hereinafter described) are extended, as shown in Figures 1 and 2, the bench cannot tip over endwise, with the legs 2 as a pivot point, assuming that the securing elements 21 are not used.

Continuing the description of the details of the support or bench 1, it may be stated that the top bars 3 are connected by an intermediate cross piece 12 and by an intermediate cross piece 14 located in front of the cross piece 12, the cross pieces 12 and 14 being located beneath the top bars 3, as indicated in Figure 2. The legs 2 are joined, near to their lower ends, by a reinforcing strip 15, and are connected, at their upper ends, by a reinforcing strip 16. An inclined brace 17 extends between the reinforcing strip 15 and the intermediate cross piece 14. Guides 18 are secured to the top bars 3 and to the rear cross piece 7, as indicated in Figure 5, and are located close to the rear end of the machine, as Figure 1 will disclose. The guides 18 converge inwardly and rearwardly.

A slide 19, detailed in Figure 3, is mounted for right-line reciprocation on the bench 1. The slide 19 embodies a U-shaped member 22, supported for reciprocation on the parts 12, 14 and 16 of the bench, the sides of the member 22 being located between the top bars 3 of the bench, so that the slide is guided for right-line reciprocation on the bench, as aforesaid. A rear cross bar 23 and an intermediate cross bar 25 are secured to the side portions of the member 22 of the slide 19 and have projecting ends 24 (Figure 3) which operate beneath the top bars 3 (Figure 6) of the bench 1 and prevent the slide from tipping downwardly at its forward end, when the slide is advanced into the position shown in Figure 1. When the slide 19 moves backwardly, as far as it can go, the cross bar 23 is above the rear cross piece 7 of the bench 1, and it is on account of this fact that the cross piece is downwardly offset, as shown at 8 in Figure 5. In order to retract the slide 19, a retractile spring 26 is provided, one end of the spring being secured to the rear cross piece 7 of the bench 1, and the other end of the spring being secured to the cross bar 25 of the slide 19, as Figure 2 will show. When the slide 19 is retracted by the spring 26, the cross bar 25 of the slide coacts with the cross piece 14 of the bench 1, the element 14 serving as a stop. When the slide 19 is advanced, as shown in Figures 1 and 2, the rear cross bar 23 of the slide engages with the cross piece 12 of the bench 1, the element 12 serving as a stop, as Figure 2 will disclose.

As thus far described, the device embodies a bench or support 1, and a slide 19 mounted for limited right-line reciprocation on the bench and held on the bench against tilting movement when the slide is advanced. A platform 27 is mounted on the slide 19 for pivotal movement about a vertical axis and for sliding movement in the direction of its length. It is upon the platform 27 that the box which is to be filled is carried during the operation of the machine.

The platform 27 includes side bars 28 which, as shown in Figures 5 and 6, are located above the top bars 3 of the bench 1 when the platform is parallel to the length of the bench, as shown in Figure 1. The side bars 28 of the platform 27 are connected by end members 29, the end members being connected by parallel longitudinal guides 30. A cap piece 31 is disposed transversely of the guides 30 as disclosed in Figures 6 and 1 and has a depending projection 32 received between the guides 30 and so constructed that the cap piece 31 always stands crosswise of the guides, so as to hold the platform for pivotal movement, and for sliding movement in the direction of its length, over the upper surfaces of the top bars 3 of the bench and of the member 22 of the slide 19, it being shown in Figure 6 that the upper surfaces of the parts 3 and 22 are in the same plane. In order to provide a means whereby the platform 27 may be turned about a vertical axis, a pivot element 33, such as a bolt, passes downwardly through the cap piece 31 and its projection 32, and it is held by nuts 34 (Figure 6) on the intermediate cross bar 25 of the slide 19.

Longitudinal rollers 35 are journaled on the side bars 28 of the platform 27, and transverse or end rollers 36 are journaled on the said side bars.

Let it be assumed that the parts are arranged as shown in Figure 4 of the drawings, the slide 19 having been retracted from the position of Figure 1, and the platform 27, having been swung on the pivot element 33 of the slide, and slid until the rear end of the platform has been directed, by the guides 18, into such a position that the side bars 28 of the slide are above the top bars 3 of the bench 1, as delineated in Figure 6. It is a matter of common knowledge that orange boxes are provided with a transverse partition dividing the box into end compartments. The operator slides the box upon the member 27, over the longitudinal rollers 35, and fills, with fruit from the bin 6, that compartment of the box which is nearest to the bin. The platform 27 then is advanced far enough so that the rear end thereof no longer lies between the guides 18, whereupon the platform 27 may be turned end for end, on the pivot element 33, to bring the empty compartment of the box adjacent to the bin 6. It is to be observed that when the platform 27 is swung on the pivot element 33, the platform also can be moved in the direction of its length, since the platform can slide with respect to the cap piece 31 and its projection 32. Considered from one view point, this feature gives the operator an increased leverage on the platform and the box whilst the box is being turned on the pivot element 33; and, considered from another view point, it renders it unnecessary for the operator to step back from the bench, should the operator choose to swing the platform by what may be called its short end, rather than its long end, a somewhat non-technical explanation which will be understood readily when the dotted line position of the platform in Figure 1 is noted.

The box having been completely filled, the platform 27 is slid forwardly until the rear cross bar 29 of the platform engages the cap piece 31 which is secured by the bolt 33 to the slide 19. The platform then picks up the slide 19 and advances the slide until the rear cross bar 23 of the slide abuts against the cross piece 12 of the bench 1, as shown in Figure 2. By the operation last above described, the box of fruit is advanced far enough so that it can be slid across the outermost transverse roller 36 of the platform, upon a conveyor 40, or any other instrumentality provided for the reception of the packed boxes. When the slide 19 is advanced, the spring 26 is extended, and, reacting, serves to draw the slide rearwardly, until the cross bar 25 of the slide, engaging the cross piece 14 of the bench, as in Figure 4, stops the rearward movement of the slide.

Having thus described the invention, what is claimed:—

1. In a device for facilitating the packing of fruit boxes, a support, a slide mounted for reciprocation on the support, a box-carrying platform, and means for mounting the platform on the slide for combined pivotal and lateral translatory movement with relation to the slide.

2. In a device for facilitating the packing of fruit boxes, a support, a slide mounted for reciprocation on the support, a box-carrying platform, means for mounting the platform on the slide for combined pivotal and lateral translatory movement with relation to the slide, and spring means for retracting the slide.

3. In a device for facilitating the packing of fruit boxes, a support, a slide mounted for reciprocation on the support, a box-carrying platform, means for mounting the platform on the slide for combined pivotal and lateral translatory movement, and interengaging elements on the platform and on the slide whereby movement will be imparted from the platform to the slide after a predetermined amount of lateral translatory movement has been imparted to the platform.

4. In a device for facilitating the packing of fruit boxes, a bench provided at one end with a leg, and equipped at its other end with an angularly disposed support-engaging finger, a slide mounted for reciprocation on the bench, a box-carrying platform mounted to rotate on the slide, and a clamping device carried by the bench and cooperating with the finger to prevent the bench from tilting on the leg when the slide and the platform are advanced to a position in which they tend to overbalance the bench.

5. In a device for facilitating the packing of fruit boxes, a bench, a leg at one end of the bench, a slide mounted to reciprocate on the bench, a box-carrying platform mounted to rotate on the slide, the slide and the platform being movable to a position in which they tend to overbalance the bench, and means for clamping the other end of the bench to a support, to prevent said overbalancing of the bench with the leg as a fulcrum.

In testimony that I claim the foregoing as my own, I have hereto affixed my signature.

PAUL P. COMMANDER.